United States Patent

Harnsberger et al.

[15] 3,654,991

[45] Apr. 11, 1972

[54] FRACTURING METHOD

[72] Inventors: Bobby G. Harnsberger; Joy T. Payton, both of Houston, Tex.

[73] Assignee: Texaco Inc., New York, N.Y.

[22] Filed: June 19, 1970

[21] Appl. No.: 47,879

[52] U.S. Cl. ............................................166/281, 166/283
[51] Int. Cl. .....................................................E21b 33/138
[58] Field of Search.................166/276, 281, 283, 292–294; 106/90, 98

[56] References Cited

UNITED STATES PATENTS

| | | | |
|---|---|---|---|
| 3,208,522 | 9/1965 | Roebuck et al. | 166/283 |
| 3,429,373 | 2/1969 | Harnsberger et al. | 166/276 |
| 2,805,719 | 9/1957 | Anderson | 106/98 X |
| 2,933,135 | 4/1960 | Johnson | 166/283 X |
| 3,046,222 | 7/1962 | Phansalkar et al. | 166/283 |
| 3,145,774 | 8/1964 | Patchen | 106/98 X |
| 3,368,623 | 2/1968 | Carter et al. | 166/276 |
| 3,467,193 | 9/1969 | Messenger | 166/294 X |

OTHER PUBLICATIONS

Oil- Well Cementing Practices in the United States, N.Y., Am. Pet. Inst., 1959, pp. 70–72.

*Primary Examiner*—David H. Brown
*Attorney*—Thomas H. Whaley, Carl G. Reis and James F. Young

[57] ABSTRACT

An improved method of fracturing an underground fluid bearing formation penetrated by a well bore for the production of fluids therefrom by injecting a composition comprising cement, sand and oil, capable of forming a fluid permeable barrier in said formation at a pressure sufficient to form fissures therein extending from said well bore, and thereafter maintaining pressure on the composition for a predetermined period to permit the composition to set and form a fluid permeable barrier in the formed fissures.

8 Claims, No Drawings

FRACTURING METHOD

The present invention relates to an improved method for the recovery of petroleum from an underground petroleum containing formation.

It is known to use various fluids in fracturing operations for the initiation and/or enlargement of fissures in underground fluid containing formations such as a hydrocarbon bearing formation. In this known procedure, a fluid called the fracturing fluid is pumped into a well bore and forced out into the formation under a pressure sufficient to open up fissures in the formation and/or to enlarge any natural fissures therein. It is desirable to add to the fracturing fluid a propping agent or mixture of such agents to maintain the created and/or enlarged fissures in the open position to enhance the flow of formation fluids therethrough into the well bore for subsequent recovery therefrom by conventional recovery techniques. Among known propping agents are solid particles such as sand, walnut shells, glass beads, metal pellets, plastics and the like.

Suitable fracturing fluids include fresh water, brines, gelled water (fresh or brine), gelled acids, and liquid hydrocarbons such as gasoline, kerosene, diesel oil, gas oil and the like, that usually have incorporated therein a bodying or gelling agent such as sodium palmitate.

Among the disadvantages associated with the known hydraulic fracturing methods using propping agents is the tendency of the formation after being fractured to reseal itself at the induced or enlarged fissures with the result that the propping agents are crushed or forced into the formation and their beneficial effects destroyed.

Another disadvantage is that the propping agents are removed from their locations in the fissures by the flow of formation fluids during subsequent petroleum production operations and their propping function is materially decreased or lost with a resultant loss of production of petroleum fluids.

It has now been found that the above disadvantages can be overcome or materially lessened by the novel fracturing method of the present invention.

An object of the present invention is to provide an improved formation fracturing method.

It is known from our commonly assigned U.S. Pat. No. 3,429,373 to treat an unconsolidated sandy formation with a treating composition which sets and forms a permeable cement barrier. The formed permeable cement barrier prevents the movement of unconsolidated sand particles with the flow of formation fluids during producing operations. The disclosure of this patent is herein incorporated by reference.

How these and other objects of the invention are accomplished will become apparent with reference to the accompanying disclosure. In at least one embodiment of the practice of the invention, at least one of the foregoing objects will be achieved.

In accordance with the present invention the improved method comprises fracturing an underground fluid bearing formation penetrated by a well bore for the production of fluids therefrom by injecting a composition comprising cement, sand and oil which is capable of forming a fluid permeable cement barrier in said formation at a pressure sufficient to form fissures therein extending from said well bore, and thereafter maintaining pressure on said composition for a predetermined period to permit the composition to set and form said fluid permeable cement barrier in the formed fissures.

The invention in a further aspect also comprises carrying out the fracturing operation with a fracturing fluid such as water, oil or the like, which optionally may contain a propping agent such as sand, glass beads or the like including mixtures thereof, and after the formation has been fractured and optionally propped open, then injecting the composition into same to lock in the propping agent and/or to keep the fissures open by the formed fluid permeable barrier.

An unexpected advantage accruing from this embodiment of the invention is that the placed propping agents are prevented from being washed out of the formed formation fissures by the permeable cement barrier during production of formation fluids with a resultant decrease and/or interruption of production of the desirable formation fluids.

The method of the present invention is believed to be particularly adaptable to fracturing operations wherein the underground formations are composed of soft calcareous matter such as the Annona Chalk formations in Louisiana. The method of the present invention will prevent and/or retard the closing up or healing of the fissures in such fractured calcareous formations.

The composition useful in the method of the present invention should meet certain requirements.

The sand component of the composition should be of a U.S. Sieve Size between about 12 and 40 mesh to permit a good cement to be formed therewith and also to provide effective propping and/or to prevent sealing of the fissures. A mesh size between about 20 and 40 mesh is preferred for excellent interstitial permeability without sacrificing desirable propping effects.

The sand component of the composition should be employed in an amount of four to eight parts by weight per part by weight of the cement component. It has been found that a frac sand, i.e. one customarily used in fracturing can also be used in the composition provided the mesh size is about 12 to about 40 mesh.

The use of a graded sand with the large grains being not more than about twice the diameter of the smaller grains, i.e. 12 mesh to 20 mesh, 20 to 40 mesh is preferred, since premature bridging of the sand grains is likely to be avoided.

Sand particles coarser than 12 mesh and finer than 40 mesh are unsuitable for use in the treating composition of the invention. The coarser particles are unsatisfactory because the strength of the set sand-cement mixture is too low. Very fine sand particles also are unsuitable because the permeability of the set sand-cement mixture is undesirably low.

The cement component of the composition of the present invention should be present in the dry mixture in a ratio of about one part of cement to from four to about eight parts by weight of sand on a weight basis. The cement component of the composition of the present invention may be any of the cements normally used in oil well cementing operations. It is preferred that the cement component be a light weight Portland cement having a density of about 75 lbs. per cubic foot and a chemical analysis approximately as follows: silicon dioxide 38.3%, aluminum oxide 13.0%, ferric oxide 5.2%, calcium oxide 35.7%, magnesium oxide 1.6% and sulfur trioxide 2.4%, with a loss on ignition of approximately 3.3%. This particular light weight Portland cement has been found to be most suitable in the composition of the present invention since permeable cements made from this cement are most stable against attack by the formation brines containing sodium chloride or sodium sulfate. Some other oil well cements are not as resistant to attack by formation brines or sulfate solutions and therefore are not as practical for use in the cement composition of the present invention. These other cements appear to lose some of their compressive strength and become eroded from contact with sodium chloride and sodium sulfate solutions. In contrast, the cements of the composition of the present invention are generally very resistant to erosion by sodium chloride or sodium sulfate solutions and do not lose their compressive strength even after prolonged exposure thereto.

The hydrocarbon oil component of the composition should be employed in an amount of from about 0.4 part to about 0.8 part by weight per part by weight of cement. It is preferred that the oil component be employed in an amount of about 0.5 to about 0.6 part by weight per part by weight of cement. Use of the oil component in this amount provides sufficient oil to wet the cement and sand components of the composition and at the same time avoids an excess thereof which could possibly damage the formation when the composition is placed therein.

Suitable hydrocarbon oils include the kerosene and diesel oil fractions of a petroleum crude oil as well as refined oils of high viscosity.

A necessary component of the petroleum oil fraction of the composition of the present invention is an oil wetting water repellent agent, i.e., a water insoluble oleophilic material of relatively high molecular weight which will permit the petroleum fraction to oil wet the surfaces of the sand and cement particles in the composition. The oil wetting agent must contain an oleophilic group and a polar group for preferential adsorption on or at the oil and sand-cement interfaces. Representative oil wetting agents useful in the practice of the present invention include the relatively high molecular weight amines such as for example, the $C_{10}$–$C_{18}$ hydrocarbylamines, decyl-, dodecyl- and octadecylamine, the $C_{10}$–$C_{18}$ fatty alcohols such as cetyl and octadecyl alcohol, the $C_{10}$–$C_{18}$ alkylated phenols and naphthols, natural fatty materials such as lanolin, lard, cottonseed oil and fatty acid glycerides, amides such as the $C_{12}$–$C_{18}$ fatty acid amides, and mixtures of these oil wetting agents.

The oil wetting agent is used in an amount of from about 0.01 to about 0.10 by weight, based on the weight of the cement particles in the composition.

It is preferred to incorporate a minor amount of finely divided silica in the composition to impart improved compressive strength to the hardened cement. This component is most effective when the fluid permeable cement barrier in the formed fissures is likely to be subject to attack by aqueous brine and/or sulfate solutions.

The finely ground silica component of the composition must be of a size sufficient to pass through the openings of a No. 200–325 sieve (U.S. Sieve Series), i.e., (a sieve having openings of 0.0029–0.0017 inch). The finely divided silica component is used in an amount of from about 0.01 to about 0.30 part, preferably 0.02–0.04 part, by weight per part of cement.

When the composition contains the finely ground silica, this component is added to the intimately mixed sand, cement, oil and oil wetting agent, then the resulting admixture is further mixed. A preferred mixing procedure is to mix the sand and cement components, separately mix the oil and oil wetting agent, mix these two mixtures together, and finally to add the finely divided silica thereto and further mix the resulting admixture.

The composition can be suspended in the aqueous carrier medium in an amount of from about 1–10 pounds, preferably 5–10 pounds per gallon. The aqueous carrier medium may also contain from about 1 to about 15 percent by weight of sodium chloride, preferably about 8–12 percent.

The aqueous carrier medium containing the suspended oil wet sand and cement solids is pumped down the well bore and into the formation to be fractured at a rate of from about 5 to 40 barrels of the suspended solids in the carrier medium per minute.

An aqueous surface active agent solution is preferably used to contact the emplaced oil wetted sand-cement particles to displace the oil therefrom and to initiate hardening of the cement. The surface active agent used must be a water soluble material to penetrate the oil-sand-cement interface and water wet the cement particles and remove the oil therefrom. Representative surface active agents that will perform satisfactorily in the present invention include anionic, cationic and nonionic materials such as the alkyl, aryl or alkaryl sulfates and sulfonates, the sulfated and sulfonated alkyloxyated amides, esters or ethers, hydrocarbylamine salts, esters or ether-esters of natural fats and oils, or alkyl phenols. The surface active agents include polyoxy-ethylene sorbitan-monolaurate, -monopalmitate and -monooleate, oxyalkylated amyl phenol, alkaryl polyether alcohols and polyoxyethylene ether. A preferred surface active agent is an ethoxylated nonylphenol containing about 9.5 moles of ethylene oxide, known by the trade name Surfonic N–95. The cement also can be caused to set by allowing the aqueous carrier medium to remain in contact with the cement particles for an extended time period.

In either case the formation is shut in for a time sufficient to permit the cement to harden.

The carrier medium containing the suspended solids is pumped down the well bore and into the formation at rates which may vary with well conditions. Generally a rate of from about 5 to 40 barrels of the suspended solids in the carrier medium per minute is suitable to perforate an interval. Such rates should give the satisfactory results and the resulting permeable cement barrier formed in the formation has a sufficiently high compressive strength and sufficient permeability to permit the flow of formation fluids therethrough.

In the practice of this invention for the fracturing of underground formations to increase their fluid productivity and/or permeability, a fracturing fluid is placed in a well penetrating the formation to be fractured, optionally through the tubing, adjacent and in contact with the face of the formation to be fractured. If desired or required, packing is employed to isolate and confine the fracturing fluid to a portion of the well exposing the formation to be fractured. Pressure is then applied via the fracturing fluid so as to build up the pressure on the formation exposed to the fracturing fluid to a value great enough to cause the formation to be fractured and form fissures therein.

The pressure required to fracture the formation varies from place to place depending upon the depth and/or the nature of the formation being fractured. Suitable fracturing pressures are in the range 1,000–15,000 p.s.i. and may be higher. When the formation fracturing pressure has been reached, the formation is fractured and the formed fissures provide additional areas for the drainage of formation fluids.

Following is a description by way of example of the method of the present invention.

EXAMPLE I

A primary fracturing fluid is prepared by intimately mixing five parts by weight of a frac sand having a particle size of 20 to 40 mesh, one part by weight of a hydraulic cement known by the trade name Trinity Lite Wate Cement and 0.033 part by weight of 200–325 mesh finely ground silica flour. There is added to the mixture with stirring 0.4 part by weight of a petroleum oil fraction which also contains 5 percent by volume of an oil wetting agent such as dodecylamine.

The resulting composition of oil wet solids is suspended in an amount of 5–10 pounds per gallon of water, and is pumped down the bore hole to the fracturing site. Pressure is applied to the suspension to fracture the formation and create fissures therein. The suspension is also forced into the created fissures by the imposed pressure and optionally can be forced further into the formation to enlarge and/or extend them by increasing and/or maintaining sufficient pressure thereon. In the formation fissures the oil wet sand-cement composition settles out of the carrier liquid. Thereafter the settled composition is preferably contacted with a aqueous solution containing about 1 percent by weight of a water soluble surface active agent such as Surfonic N–95 to penetrate the oil-sand-cement particles and water wet the cement. The cement hardens and forms a fluid permeable barrier in the fissures to permit formation fluids to pass therethrough while keeping the fissures open to the flow of these fluids.

EXAMPLE II

In a "tailing in" operation, the formation is fractured in a conventional manner such as by hydraulic fracturing using a frac sand as the propping agent in the aqueous fracturing fluid. After the formation is fractured, the composition suspended in the aqueous carrier is pumped down the well bore and is injected into the created fractures. The injected composition may then be treated with an aqueous solution containing a water soluble surface active agent to contact the cement component and cause same to harden. The well is shut in until the cement has set and forms the fluid permeable barrier in the fissures. Thereafter, formation fluids can be removed through the formed barrier.

We claim:

1. In a method of fracturing an underground fluid bearing formation penetrated by a well bore for the production of hydrocarbons therefrom employing a fracturing fluid which is injected into the formation at a pressure sufficient to form fissures therein extending from said well bore and force the fracturing fluid into the formed fissures, the improvement which comprises employing as the fracturing fluid a composition consisting essentially of cement, from four to eight parts by weight of sand having a mesh size between about 12 and 40 mesh, from 0.02 to 0.04 part by weight of a finely divided silica of 200–325 mesh size, from 0.4 to 0.8 part by weight of a hydrocarbon oil and from 0.01 to about 0.10 part by weight of a water insoluble olephilic material of relatively high molecular weight, each per part by weight of cement, said composition being suspended in an aqueous carrier medium in an amount of from about 1 to 10 pounds per gallon of said aqueous carrier medium, contacting said fracturing fluid in said fissures with an aqueous solution of a surface active agent to water-wet the cement particles, maintaining said pressure on said contacted fracturing fluid for a period sufficient to permit the composition to set and form a fluid permeable cement barrier in said fissures, and thereafter producing hydrocarbons from said formation through said formed permeable cement barrier.

2. In a method as defined in claim 1, initially fracturing said formation by a fracturing fluid containing a propping agent, and thereafter injecting said composition into the fissures formed by said fracturing fluid.

3. In a method as defined in claim 1, wherein said fracturing occurs in a soft calcareous formation.

4. In a method as defined in claim 1, wherein said oil is a member selected from the group consisting of kerosene, diesel oil and refined oil.

5. A method of preventing the closure of fissures in a hydrocarbon bearing underground fractured soft calcareous formation to permit the production of hydrocarbons from said formation, which comprises injecting a hydraulic fracturing fluid down a bore hole communicating with said formation at a pressure sufficient to form fissures therein, injecting into said formed fissures a treating composition consisting essentially of cement, from four to eight parts by weight of 20–40 mesh size sand, from 0.4 to 0.8 part by weight of a hydrocarbon oil, from 0.01 to 0.10 part by weight of a oil wetting agent, and 0.02 to 0.04 part by weight of finely divided silica of 200–325 mesh size, each per part by weight of cement, said composition being suspended in an aqueous carrier medium in an amount of from about 1 to 10 pounds per gallon of said carrier medium, contacting said injected treating composition in said fissures with an aqueous solution of a water soluble surface active agent to water wet the cement component thereof, maintaining pressure on said composition for a predetermined period to permit the formation of a fluid permeable cement barrier in said formed fissures, where said hydrocarbons in said formation can be recovered through said formed permeable cement barrier.

6. In a method as defined in claim 5, wherein said oil is a member selected from the group consisting of kerosene, diesel oil and refined oil.

7. In a method as defined in claim 5, wherein the fracturing fluid contains a propping agent.

8. In a method as defined in claim 7, wherein the propping agent is sand.

* * * * *